Patented Feb. 10, 1953

2,628,187

UNITED STATES PATENT OFFICE 2,628,187

MEDICINAL MINERAL OIL VEHICLE THICKENED WITH POLYETHYLENE

Stanley H. Frohmader and Milton J. Shoemaker, Madison, Wis., assignors to Research Products Corporation, Madison, Wis., a corporation of Wisconsin No Drawing. Application May 6, 1950, Serial No. 160,578

12 Claims. (Cl. 167—82)

This invention relates to improvements in viscous compositions and methods of making the same, and particularly such compositions containing medicaments or other ingredients and having a modified mineral oil base, and which are in the form of a plastic, non-fluid paste or cream or may be of a liquid consistency. The product is adapted primarily for topical use as ointments, salves, cosmetic creams and the like, but is also adapted for other uses as will be set forth hereinafter.

Viscous compositions for the general purposes mentioned are known, having as their base petrolatum, lanolin, beeswax, etc. Difficulties have been encountered with such compositions in that their manufacture requires extensive mixing and milling, which is time and labor consuming and requires much machinery and plant space. They also exhibit the difficulties that the medicaments or other ingredients thereof tend to separate and segregate with time, their viscosity tends to change with temperature and with time, and the contained medicaments, etc. are not always readily released for absorption by the skin or other surface upon which they are used.

The present invention relates to an improved viscous composition having the important advantage that manufacture is simple and requires little time, labor, machinery and plant space. It has the additional advantage that it has a uniform homogeneous consistency which is retained for an indefinite period of time without undergoing any substantial separation of the ingredients. Also, it undergoes relatively little change in viscosity with change in temperature, so that when non-fluid cream is applied to the skin it remains thereon substantially in its initial consistency. It does not melt at summer heat as at a temperature of 50° C. whereby there is little tendency for the ingredients to separate under such conditions. The base or vehicle and the medicaments or other ingredients are very readily mixed together. Ointments are readily wiped off of the skin and leave no apparent greasy residue. They are readily cleaned from containers and utensils. Also, the ointments more readily release the contained medicaments in contact with an absorptive surface such as the skin whereby the medicaments are efficiently utilized. In all of these respects, the composition of the invention is a decided improvement over compositions which are presently known.

The viscous composition of the present invention contains mineral oil in the base and in accordance with the invention it has been discovered that a cream having the improved properties described is formed by dissolving in such oil at high temperature a modifying agent which is soluble therein at said high temperature and substantially insoluble at a low temperature, and rapidly cooling the solution from said high temperature to said low temperature. By "low" temperature is meant a temperature of 50° C. or lower and by "high" temperature is meant any temperature above this and preferably above 70° C. The modifying agent is a polymer of ethylene, as will be described in detail hereinafter. The oils which may be used and which are embraced within the term "mineral oil" as the same is used herein in the specification and claims are the oils which are liquid at any temperature in the range from 0° C. to 60° C. and which are essentially hydrocarbons occurring in mineral oil, their distillates and their cracked or polymerized derivatives, an example of the last being polybutene which includes the polymers of butylene and its isomers. The mineral oil may be of any desired character or viscosity, from one which is a thin liquid to one which is thick such that it does not flow at ordinary temperature (20° C.).

When using a mineral oil or a composition thereof which is of low viscosity, the rapid cooling of the solution containing the modifying agent has a pronounced thickening effect, and compositions which in the absence of the rapid cooling or of the modifying agent are liquid at room temperatures, with the proper amount of modifying agent, are thickened by the procedure into a non-fluid cream or paste. The cream is thixotropic, homogeneous and of smooth texture, and it retains its character and consistency without separation or segregation of the constituents or change in viscosity for long periods of time and under varying temperature conditions.

As the modifying agent, the polymers of ethylene may be used having an average molecular weight of 3500 or more as determined by the William Plastometer Method (J. I. and E. C., vol. 16, No. 4, page 362; 1924). Polyethylenes having an average molecular weight varying from 3500 to 26,000 have been used successfully. Varying amounts of the modifying agent may be used as will be described hereinafter but usually only a small proportion is required and produces remarkable results in the form of increased viscosity and the other beneficial properties mentioned heretofore. Where the mineral oil is itself of high viscosity the thickening effect may be of less importance than the other advantages of homogeneity, etc.

In making the cream composition, a modifying proportion of the polyethylene is dissolved in the mineral oil at the elevated temperature required for solution. In the absence of an opacity producing substance, the solution is clear and transparent. The medicaments or other ingredients may be incorporated in the mixture at this time if desired. If the resulting mixture is not fluid the temperature thereof is raised sufficiently to bring it to a fluid condition and it is agitated until a thoroughly uniform intimate mixture is obtained. It is then rapidly cooled to a temperature at which the polyethylene is insoluble in the mineral oil, the cooling being at a rate of at least one degree C. per minute. As a modification, the medicaments or other ingredients may be incorporated after instead of prior to the cooling operation, in which case they are thoroughly distributed by a mixing or milling operation. The product is an unctuous cream which is of smooth, homogeneous consistency. The rapid cooling results in the improved properties described heretofore including in most cases a pronounced increase in viscosity, which properties are not obtained when the solution is subjected to ordinary slow cooling as by allowing a mass of the mixture to cool in an atmosphere at room temperature.

With regard to the proportions of polyethylene in the mineral oil to produce a consistency modifying effect, these may vary over wide limits, depending upon several factors, such as the viscosity of the oil, the molecular weight of the polyethylene and the character and quantity of the medicaments or other ingredients, etc. By "consistency modifying effect" is meant the effect in producing any of the improved characteristics described heretofore. In general, the modifying effect of a given proportion of polymer of ethylene increases as the molecular weight of the polymer increases and also as the viscosity of the oil increases. Substantial modifying effects have been obtained by the use of an amount of polyethylene equal to about 0.25% to about 50% of the weight of the mineral oil-polyethylene base, the lower proportion being useful with an oil of relatively high viscosity, say 340–350 seconds Saybolt Universal at 38° C. and a polyethylene of high average molecular weight, say 18,000–20,000, and the high proportion being useful when the oil is of relatively low viscosity, say 75–80 seconds Saybolt Universal at 38° C. and the polyethylene is of relatively low molecular weight, say 3700. The solution of the polymer of ethylene in the oil is carried out by mixing the oil and polymer together at an elevated temperature usually 60° C. to 130° C.

When the solution of mineral oil and modifying agent, without opacity producing ingredients, is cooled rapidly through the proper temperature range, a clouding effect occurs during which the solution changes from a clear liquid to one which is cloudy or turbid. The clouding effect accompanies the change of condition which provides the improved properties and the two phenomena, cloudiness and altered condition, are related and exist together in the rapidly cooled product. The temperature at which the clouding effect begins varies with the molecular weight and concentration of the ethylene polymer as exemplified by the following schedule. The Saybolt viscosity of the mineral oil is given in seconds universal at 38° C.

| Viscosity of oil, seconds | Mol. Wt. of Polyethylene | Percent by wt. of Polyethylene | Cloud point Temperature, ° C. |
|---|---|---|---|
| 340–350 | 3,700 | 2 | 55 |
| 340–350 | 3,700 | 10 | 76 |
| 340–350 | 7,000 | 2 | 63 |
| 340–350 | 18,000–20,000 | 2 | 78 |
| 340–350 | 24,000–26,000 | 2 | 80 |
| 75–80 | 18,000–20,000 | 2 | 77.5 |

With polyethylenes having molecular weights in a narrow range, the clouding or cloudiness increases over a cooling range of a few degrees. A mixture of polyethylenes of widely different molecular weights may be used, in which case the cloud range may be quite wide. It is probably caused by the modifying agent going out of true solution and into dispersion, and it continues as it passes out of solution. For simplicity, this range at which clouding occurs in the absence of an opacity producing agent will herein, in the specification and claims, be called the cloud range and the point at which substantial clouding begins will be called the cloud point. The cloud range is the temperature range above which the polyethylene is soluble in the mineral oil and below which it is insoluble or substantially so.

The solution, with or without the medicaments or other ingredients, is cooled through a temperature range including the cloud range or at least a substantial portion thereof. The temperature of the solution is first adjusted so that it is above or in the cloud range and then it is cooled rapidly to a lower temperature which is within or below the cloud range. It is preferred that the rapid cooling extend through the entire cloud range, but if the cloud range is wide the cooling may extend through less than the entire cloud range. A cooling range of about 10 degrees C. produces a substantial improvement effect. Greater ranges usually produce an increased effect and are preferred. The rate of cooling should be at least one degree C. per minute and rates as high as 8,000 degrees C. per minute have been used and have produced remarkable improvement effects. For general purposes, cooling from 80° C. or higher to 50° C. or lower in the space of one minute or less produces satisfactory results. This provides a cooling rate of at least 30 degrees C. per minute. The cooling may be carried as low as desired. Under some conditions there is a tendency for a small amount of the oil to separate or bleed from the ointment in the cooled product and this tendency is reduced to a minimum so that there is substantially no separation if the rapid cooling is stopped at a temperature of about 35° C. to 50° C. With polyethylene of an average molecular weight of 18,000–20,000 the optimum stopping temperature is about 45° C. to 50° C. and with polyethylene of an average molecular weight of 7000 the optimum stopping temperature is about 40° C. to 43° C. Any suitable method of heat exchange may be used for cooling. In a method which has been used with satisfactory results, the heated dispersion is flowed in the form of a thin layer upon one surface of a sheet of heat conductive material such as metal, while the opposite surface is cooled by a liquid coolant, such as water.

The character of the rapidly cooled ointment is different from that of one which is slow cooled, as by allowing a mass thereof to stand in a cool atmosphere as at 20° C. This is evidenced by the relative light transmitting properties of the rapidly cooled and slow cooled products. The following schedule shows the relative transmission data as measured on the Coleman spectrophotometer of two specimens composed of 95% mineral oil (Saybolt viscosity 340–350 seconds universal at 38° C.) and 5% polyethylene of an average molecular weight of 18,000–20,000, ingredients other than the oil and polyethylene being omitted to avoid any factors which might affect the transmission. The following is the light transmission data:

| Wave Length of Light Millimicrons | Percent Transmission | |
|---|---|---|
| | Slow cooled product | Rapidly cooled product |
| 375 | 80.5 | 99 |
| 400 | 80.0 | 100 |
| 450 | 83.5 | 100 |
| 500 | 85.5 | 100 |
| 550 | 87.5 | 100 |
| 600 | 89.0 | 100 |
| 650 | 90.0 | 100 |
| 700 | 91.0 | 100 |

The ingredients which may be incorporated with the oil-polyethylene base may be medicaments or any other which may be desired. They may be liquid, as a medicinal oil such as methyl salicylate or they may be solid, and they may be soluble or insoluble in the mineral oil-polyethylene base. Several examples are given hereinafter illustrating the making of cream compositions for different purposes. In each case the Saybolt viscosity of the mineral oil is given in seconds Universal at 38° C. and the molecular weight of the polyethylene is given. These examples are illustrative only and mineral oils of different viscosity and ethylene polymers of different average molecular weight may be used as described heretofore.

*Example 1*

| | Parts by weight |
|---|---|
| Mineral white oil (visc. 340–350 sec.) | 45 |
| Polyethylene (mol. wt. 18,000–20,000) | 5 |
| Methyl salicylate | 50 |

The polyethylene is dissolved in half of the mineral oil at 130° C. and the remaining portion of the oil is then added. The solution is adjusted to 90° C. and the methyl salicylate, which is a medicinal oil, is added. The latter being soluble in the mineral oil forms a clear, thin, readily flowing solution with stirring.

The liquid is cooled rapidly from the temperature of 90° C. by flowing it in a thin layer against the exterior surface of a hollow metal drum, the interior surface of which is contacted by relatively cold water, a temperature of 150° C. being suitable. The mixture spreads out into the form of a thin layer upon the drum surface and cools suddenly, and in this procedure the cooling has been observed to occur within the space of 0.1 minute. The composition thickens into a nonfluid, unctuous cream which is scraped from the drum. The rate of flow upon the drum and the other heat exchange conditions are controlled so that the cooling is stopped when the composition has reached a temperature of 45° C. to 50° C. The concentration of polyethylene in mineral oil in the composition remains substantially unchanged during the cooling operation. The composition has a viscosity of approximately 2610 poises at 20° C., when measured by the Brookfield rotational viscosimeter at one R. P. M. It has a smooth homogeneous consistency and is stable in that it retains its consistency for a long period of time. By "stable" it is meant that when a quantity of the composition is placed in a two ounce capacity jar having an inside diameter of 1⅞" and the surface is depressed to form an inverted right circular cone the base of which is substantially coextensive with the inside diameter of the jar and the genetrix of which is at 45° angle to the base, not more than 0.5 gram of the oil separates from the ointment after standing for eighteen hours at 50° C. The same composition when allowed to cool from 90° C. to 20° C. by the ordinary method of cooling, i. e., by standing in the atmosphere at that temperature, has a viscosity of approximately 2320 poises when measured by the same method, and while it is of homogeneous consistency immediately after cooling it does not remain thus but a portion of the oil separates as a clear liquid upon the top of the composition. Also, the rapidly cooled product has a consistency value of 318 by the cone penetrometer test (A. S. T. M. specification D217–38T (1939)) while the slowly cooled product has a value of over 380.

The cream composition of this example is thixotropic and is an excellent salve or ointment for topical application for the relief of muscular aches and pains. The consistency of the cream is retained for a long period of time and remains substantially constant in contact with the skin and there is little tendency to spread to extraneous areas. At the same time the methyl salicylate is maintained in available form for absorption by the skin.

*Example 2*

| | Parts by weight |
|---|---|
| Polybutene (mol. wt. 370; visc. 335 sec.) | 45 |
| Polyethylene (mol. wt. 18,000–20,000) | 5 |
| Methyl salicylate | 50 |

The process is similar to that described in connection with Example 1, and the end product is also similar. The polybutene is used in place of the mineral oil of Example 1 and is the equivalent thereof.

*Example 3*

| | Parts by weight |
|---|---|
| Mineral oil (visc. 75–80 sec.) | 89 |
| Polyethylene (mol. wt. 18,000–20,000) | 1 |
| Methyl salicylate | 10 |

The process is similar to that of Example 1. The product is a homogeneous fluid rubbing ointment for the relief of muscular pains.

*Example 4*

| | Parts by weight |
|---|---|
| Mineral oil (visc. 340–350 sec.) | 45 |
| Polyethylene (mol. wt. 18,000–20,000) | 5 |
| Corn oil | 50 |

The process is similar to that described above in connection with Example 1. The ingredients are intimately mixed together and heated to a temperature of approximately 90° C., and the mixture is then rapidly cooled. The result is a non-fluid cream useful as a skin conditioner and as a base for cosmetics and lotions.

Ointments and creams may be made by a process similar to that of Example 4 by employing oils other than corn oil, as for example, olive oil, cotton seed oil, almond oil, neat's-foot oil, tall oil, cade oil. The proportions of the ingredients are adjusted to obtain the desired amount of medicament and consistency in the final composition.

*Example 5*

| | Parts by weight |
|---|---|
| Mineral oil (visc. 340–350 sec.) | 75 |
| Polyethylene (mol wt. 18,000–20,000) | 5 |
| Gum camphor | 20 |

In this example the medicament is incorporated after the rapid cooling operation. The polyethylene is first dissolved in the mineral oil and the solution is then rapidly cooled in a procedure similar to that described heretofore in connection with Example 1. The cooled product is an unctuous cream similar in consistency to the product of Example 1. The gum camphor is subdivided into small pieces and masticated into the cream base until the camphor is dissolved.

As an alternative, the camphor may be added to the hot mixture before the rapid cooling. The result is a cream having substantially the same characteristics as described in connection with Example 1. It is useful as an ointment for the relief of colds, skin irritation caused by wind, sunburn, etc.

Example 6

| | Parts by weight |
|---|---|
| Mineral oil (visc. 75–80 sec.) | 86.5 |
| Polyethylene (mol. wt. 18,000–20,000) | 6.5 |
| Powdered iodine | 7 |

The process of formation is substantially the same as that given in connection with Example 5 with the substitution of the iodine for the gum camphor. The iodine goes into solution in the viscous oil-polyethylene base. The resulting ointment has the characteristics described in connection with Example 1 and is useful for therapeutic purposes.

Example 7

| | Parts by weight |
|---|---|
| Mineral oil (visc. 335–360 sec.) | 68.5 |
| Polyethylene (mol. wt. 7000) | 6.5 |
| Menthol crystals | 25 |

The menthol crystals are soluble in the viscous ointment base and the process is similar to that used in Example 5. A mixture of menthol and camphor may be used together in a composition of this character.

Example 8

| | |
|---|---|
| Mineral oil (visc. 340–350 sec.) | 91 |
| Polyethylene (mol. wt. 18,000–20,000) | 5 |
| Glycerin | 2 |
| Phenol | 2 |

The phenol and glycerin are mixed together and warmed to facilitate the solution of the phenol in the glycerin. The procedure is otherwise similar to that of Example 5, i. e., the thickened base of mineral oil and polyethylene is made by rapid cooling and the solution of phenol in glycerin is mixed into the base. The result is a non-fluid phenol ointment of superior properties.

To illustrate the superior release properties of the ointment, it was compared to an ointment of similar viscosity containing 2% by weight of phenol, 2% glycerine and 96% white petrolatum. A spot of each ointment was placed on a sterile petri dish and nutrient agar which had been inoculated with *Bacillus staphylococcus* was poured around the ointment on the dish. The effectiveness of release of the phenol is proportional to the width of the zone of inhibition of growth of the bacterial. After standing six days the width of the zones of inhibition were as follows: for the ointment of Example 7, 30 mm.; for phenol-white petrolatum ointment, 17 mm.

Example 9

| | Parts by weight |
|---|---|
| Mineral oil (visc. 340–350 sec.) | 85 |
| Polyethylene (mol. wt. 18,000–20,000) | 5 |
| Oil of mustard (synthetic) | 10 |

The procedure is similar to that of Example 5, i. e., the oil of mustard is mixed thoroughly at ordinary temperatures with the mineral oil-polyethylene base which has been thickened to a non-fluid condition by rapid cooling. The same procedure may also be used to prepare a composition of castor oil or Turkey red oil (sulfonated castor oil) as the active ingredient in place of the oil of mustard. The castor oil composition may be used as a laxative and also as a machinery lubricant and a leather dressing. The Turkey red oil composition may be used as a textile lubricant and as a lubricant for machine cutting operations.

Example 10

| | Parts by weight |
|---|---|
| Mineral oil (visc. 340–350 sec.) | 75 |
| Polyethylene (mol. wt. 18,000–20,000) | 5 |
| Zinc oxide powder | 20 |

The process is generally similar to that of Example 5, i. e., the thickened non-fluid base of mineral oil and polyethylene is preferably first formed and then the zinc oxide is intimately mixed into the base and preferably thoroughly dispersed by means of a colloid or pigment mill. In this composition the solid particles of zinc oxide are physically supported in dispersed condition in the ointment. The latter is useful as a healing and sterilizing ointment for external use. Compositions may be made in similar procedures employing flowers of sulfur, boric acid powder or ammoniated mercury in place of the zinc oxide. A composition may likewise be made with finely powdered silica gel, the use of which provides an ointment having the property of absorbing moisture. Many other substances may be used and the proportions of the various ingredients are adjusted to provide the desired consistency and quantity of medicament.

Example 11

| | Parts by weight |
|---|---|
| Mineral oil (visc. 340–350 sec.) | 52 |
| Polyethylene (mol. wt. 18,000–20,000) | 2.8 |
| Tannic acid | 20 |
| Glycerin | 25 |
| Sodium sulfite | .2 |

The thickened oil-polyethylene base is formed as described in connection with Example 5. The tannic acid, glycerin and sodium sulfite are intimately mixed to form a paste which is intimately mixed with the thickened (by rapid cooling) oil-polyethylene base to make an ointment cream suitable for external use for application to burns, etc.

Example 12

| | Parts by weight |
|---|---|
| Mineral oil (visc. 340–350 sec.) | 80 |
| Polyethylene (mol. wt. 18,000–20,000) | 5 |
| Ethanol | 2.5 |
| Water | 2.5 |
| Belladonna powder | 10 |

The ethanol is dissolved in water and the belladonna is triturated in the water-ethanol solution and the resulting paste is intimately mixed with the thickened oil-polyethylene base to form an ointment cream.

Example 13

| | Parts by weight |
|---|---|
| Mineral oil (visc. 340–350 sec.) | 44 |
| Polyethylene (mol. wt. 18,000–20,000) | 2.5 |
| Neat's-foot oil | 46 |
| Paraffin | 2.5 |
| Calcium stearate | 5 |

The polyethylene is dispersed in the mineral oil and the remaining ingredients are then added and the mixture is stirred and heated to melt the paraffin and dissolve the calcium stearate and polyethylene and form a clear liquid. The temperature is then adjusted to about 90° C. and the mixture is cooled rapidly as in Example 1. The result is a smooth paste which is an excellent leather dressing.

*Example 14*

| | Parts by weight |
|---|---|
| Mineral oil (visc. 340–350 sec.) | 93 |
| Polyethylene (mol. wt. 18,000–20,000) | 5 |
| Penicillin powder | 2 |

The mineral oil-polyethylene paste is formed by rapid cooling as in Example 5 and the penicillin is then incorporated by thorough agitation.

In addition to the examples given above of compositions containing a single medicinal ingredient, several ingredients or mixtures of ingredients may be incorporated in the same composition.

The relatively large number of examples given heretofore are not exhaustive of the compositions which can be made, but are given rather for the purpose of illustrating the several different ways in which the medicaments and other ingredients may be incorporated with the oil-polyethylene base to form a smooth cream of the desired consistency. There are many other compositions which can be made and it is intended to embrace within the scope of the invention the compositions containing incorporated therein medicaments or other ingredients which are dissolved in the oil or suspended in the form of solid particles. The examples also illustrate the relatively wide variations which may be made in the proportions of the oil, the polyethylene and of the oil-polyethylene base with respect to the other ingredients. In each case, the oil-polyethylene base is of primary importance in producing the uniform consistency, the stability, including the resistance to segregation, the uniform viscosity over a wide temperature range, and the improved release of the contained ingredients whereby they are available for utilization.

The proportions of the oil-polyethylene base in the final cream are not critical and may be varied over a wider range than that disclosed by the examples. For example, the cream may contain as little as 1% or 2% or even less of the medicament or other active agent, depending on the potency thereof, and the remainder may be composed of the oil-polyethylene base.

Where the viscosity of the composition of the present invention has been increased by the rapid cooling operation, it is reduced by raising the temperature thereof from an initial temperature below the cloud range, for example 20° C., to a point within or above the cloud range and then cooling the composition slowly to the initial temperature as by allowing a mass thereof to stand in an atmosphere at the initial temperature.

The mineral oil-polyethylene base for the composition of the present invention and the method of making said base are the subject of the copending application of Stanley H. Frohmader and Virjean Archer, Serial No. 43,548, filed August 10, 1948.

What is claimed is:

1. A viscous composition having improved consistency and stability characteristics comprising a medicament and mineral oil containing dispersed therein polyethylene having a molecular weight of at least 3,500 in an amount equal to approximately .25% to 50% of the combined weight of the polyethylene and the mineral oil, said polyethylene having been initially in solution in said mineral oil and said solution having been cooled at a rate of at least thirty degrees C. per minute through a temperature range including the cloud point of said solution while maintaining the concentration of polyethylene in mineral oil in said solution substantially unchanged.

2. The viscous composition as claimed in claim 1 in which the mineral oil is polybutene.

3. The viscous composition as claimed in claim 1 in which the medicament is a finely divided solid.

4. The viscous composition as claimed in claim 1 in which the medicament is a medicinal oil.

5. The method of improving the consistency and stability characteristics of a viscous composition comprising a medicament and a mineral oil supporting agent for said medicament, which comprises dissolving polyethylene in the mineral oil component of said composition at a temperature above the cloud point of said mineral oil-polyethylene solution, said polyethylene having a molecular weight of at least 3,500 and being present in an amount equal to approximately .25% to 50% of the combined weight of said polyethylene and said mineral oil, and cooling said solution at a rate of at least thirty degrees C. per minute through a temperature range including the cloud point of said solution while maintaining the concentration of polyethylene in mineral oil in said solution substantially unchanged.

6. The method of improving the consistency and stability characteristics of a viscous composition comprising a medicament and a mineral oil supporting agent for said medicament, which comprises dissolving polyethylene in the mineral oil component of said composition at a temperature above the cloud point of said mineral oil-polyethylene solution, said polyethylene having a molecular weight of at least 3,500 and being present in a amount equal to approximately .25% to 50% of the combined weight of said polyethylene and said mineral oil, cooling said solution at a rate of at least thirty degrees C. per minute through a temperature range of at least ten degrees C. including at least a substantial portion of the cloud range of said solution while maintaining the concentration of polyethylene in mineral oil in said solution substantially unchanged.

7. The method of improving the consistency and stability characteristics of a viscous composition comprising a medicament and a mineral oil supporting agent for said medicament, which comprises dissolving polyethylene in the mineral oil component of said composition at a temperature above the cloud point of said mineral oil-polyethylene solution, said polyethylene having a molecular weight of at least 3,500 and being present in an amount equal to approximately .25% to 50% of the combined weight of said polyethylene and said mineral oil, cooling said solution at a rate of at least thirty degrees C. per minute through a temperature range of at least ten degrees C. including at least a substantial portion of the cloud range of said solution while maintaining the concentration of polyethylene in mineral oil in said solution substantially unchanged, and stopping said rapid cooling at a temperature of about 35° C. to 50° C.

8. The method of improving the consistency and stability characteristics of a viscous composition comprising a medicament and a mineral oil supporting agent for said medicament, which comprises mixing with said medicament a solution of polyethylene in mineral oil, said polyethylene having a molecular weight of at least 3,500 and being present in an amount equal to approximately .25% to 50% of the combined weight of the polyethylene and the mineral oil, and cooling said composition at a rate of at least thirty degrees C. per minute through a temperature range of at least ten degrees C. including the cloud point of said mineral oil-polyethylene solution while maintaining the concentration of polyethylene in mineral oil in said solution substantially unchanged.

9. The method of improving the consistency and stability characteristics of a viscous composition comprising a medicament and a mineral oil supporting agent for said medicament, which comprises forming a solution of polyethylene in said mineral oil at a temperature above the cloud point of said solution, said polyethylene having a molecular weight of at least 3,500 and being present in an amount equal to approximately .25% to 50% of the combined weight of said polyethylene and said mineral oil, cooling said solution at a rate of at least thirty degrees C. per minute through a temperature range of at least ten degrees C. including the cloud point of said solution while maintaining the concentration of polyethylene in mineral oil in said solution substantially unchanged, and mixing said medicament into said cooled solution.

10. The method of preparing a composition having improved consistency and stability characteristics which comprises forming a solution of polyethylene in mineral oil at a temperature above the cloud point of said solution, said polyethylene having a molecular weight of at least 3,500 and being present in an amount equal to approximately .25% to 50% of the combined weight of the polyethylene and the mineral oil, and cooling said solution at a rate of at least thirty degrees C. per minute from a temperature above the cloud point of said solution to a temperature of about 35° C. to 50° C. while maintaining the concentration of polyethylene in mineral oil in said solution substantially unchanged.

11. The method of improving the consistency and stability characteristics of a viscous composition comprising a medicament and a mineral oil supporting agent for said medicament, which comprises mixing with said medicament a solution of polyethylene in mineral oil, said polyethylene having a molecular weight of at least 3,500 and being present in an amount equal to approximately .25% to 50% of the combined weight of the polyethylene and the mineral oil, and while said composition is at a temperature above the cloud point of said mineral oil-polyethylene solution bringing a thin layer of said composition into contact with a surface at a temperature below the cloud point of said solution in such manner that said composition is cooled at a rate of at least 30 degrees C. per minute through a temperature range including the cloud point of said solution.

12. The method of making a thixotropic composition containing a medicament, mineral oil and polyethylene, which comprises preparing a composition containing said mentioned ingredients at a temperature above the cloud point of the mineral oil-polyethylene component of said composition whereby said polyethylene is in solution in said mineral oil, said polyethylene having an average molecular weight of at least 3,500 and being present in an amount equal to approximately .25% to 50% of the combined weight of said polyethylene and said mineral oil, and cooling said composition in the form of a thin layer at a rate of at least 30 degrees C. per minute through a temperature range including the cloud point of said mineral oil-polyethylene solution.

STANLEY H. FROHMADER.
MILTON J. SHOEMAKER.

REFERENCES CITED

The following references are of record in the file of this patent:

UNITED STATES PATENTS

| Number | Name | Date |
| --- | --- | --- |
| 2,085,693 | Byrne | June 29, 1937 |
| 2,312,715 | Holmes | Mar. 2, 1943 |
| 2,384,848 | Peters | Sept. 18, 1945 |

OTHER REFERENCES

Richards—British Plastics, April 1945, pages 146 to 151.